United States Patent [19]
Mani et al.

[11] Patent Number: 5,528,234
[45] Date of Patent: Jun. 18, 1996

[54] TRAFFIC MONITORING SYSTEM FOR DETERMINING VEHICLE DIMENSIONS, SPEED, AND CLASS

[76] Inventors: Siva A. Mani, 4 Trodden Path, Lexington, Mass. 02173-8202; Arunachalam Balaraman, 11 Augustine Rd., Groton, Mass. 01450

[21] Appl. No.: 189,761

[22] Filed: Feb. 1, 1994

[51] Int. Cl.[6] ................................................ G08G 1/04
[52] U.S. Cl. ..................... 340/933; 340/943; 340/928; 340/936; 364/438; 364/436; 367/89
[58] Field of Search ................................. 340/943, 933, 340/928, 936; 364/436–438; 367/89, 92, 91, 90

[56] References Cited

U.S. PATENT DOCUMENTS

| | | | |
|---|---|---|---|
| 4,069,888 | 1/1978 | Wolters et al. | 180/98 |
| 4,187,487 | 2/1980 | Numata et al. | 367/93 |
| 4,442,512 | 4/1984 | Kodera et al. | 367/87 |
| 4,597,068 | 6/1986 | Miller | 367/87 |
| 4,674,069 | 6/1987 | Mizuno | 340/943 |
| 4,701,893 | 10/1987 | Muller et al. | 367/87 |
| 4,789,941 | 12/1988 | Nunberg | 340/943 |
| 5,101,200 | 3/1992 | Swett | 340/928 |
| 5,173,692 | 12/1992 | Shapiro et al. | 340/943 |

OTHER PUBLICATIONS

The TC–30 Presence Detector, 2 pages brochure from Microwave Sensors, Ann Arbor, MI (May 1990).
Aikdo Dual Delineator Automatic Vehicle Classifier, 2 pages brochure from Aikdo Computer Systems Ltd, Melville, NY Jan. 1988.

*Primary Examiner*—Donnie L. Crosland
*Attorney, Agent, or Firm*—David Pressman

[57] ABSTRACT

A traffic monitoring system includes many monitoring nodes (10) distributed along many roads. A sonar ranging module (12) in each node continually measures the height of vehicles (19) crossing thereunder with repeated sonar pulses. A microcontroller (14) contains suitable instructions for estimating the speed of the vehicle by assigning a length to the vehicle based on its measured height, and dividing the length by the crossing time that the vehicle took to cross under the sonar module. The speed information from each node is transmitted to a central station (11) via a communication link (17). In a second embodiment, each node (10A) includes a pair of sonar modules (12A) spaced apart along a road. These measures the height of the vehicle, as well as the traversal time it takes to travel between both sonar modules. The microcontroller (14A) contains suitable instructions for dividing the modules' separation distance by the traversal time to accurately calculate the speed of the vehicle. The vehicle's length can be estimated by multiplying the calculated speed by the crossing time. The class of the vehicle can be estimated by looking its dimensions in a probability table (40) which relates vehicular dimensions with vehicle classes.

20 Claims, 6 Drawing Sheets

|  | 32 | 33 | 34 | 35 | 36 |
|---|---|---|---|---|---|
| Number | Name | Class | Height | Length | Number |
| 1 | GM | 5 | 9 | 35 | 100,000 |
| 2 | GM | 5 | 10 | 40 | 80,000 |
| 3 | GM | 6 | 10 | 43 | 120,000 |
| 4 | GM | 7 | 10 | 48 | 90,000 |
| 5 | GM | 7 | 11 | 52 | 77,000 |
| 6 | Ford | 5 | 8 | 32 | 86,000 |
| 7 | Ford | 5 | 9 | 36 | 88,000 |
| 8 | Ford | 6 | 9 | 40 | 40,000 |
| 9 | Ford | 6 | 10 | 44 | 75,000 |
| 10 | Ford | 7 | 10 | 50 | 60,000 |
| 11 | Ford | 7 | 11 | 52 | 30,000 |
| 12 | Chrysler | 5 | 9 | 34 | 62,000 |
| 13 | Chrysler | 5 | 10 | 39 | 43,000 |
| 14 | Chrysler | 6 | 10 | 45 | 25,000 |
| 15 | Chrysler | 6 | 11 | 48 | 20,000 |
| 16 | Chrysler | 7 | 10 | 49 | 27,000 |
| 17 | Chrysler | 7 | 11 | 51 | 30,000 |

Fig. 5A

| Height | Length | Class | Probability, % |
|---|---|---|---|
| 8 | 30 | 5 | 100 |
| 8 | 30 | 6 | 0 |
| 8 | 30 | 7 | 0 |
| 9 | 35 | 5 | 100 |
| 9 | 35 | 6 | 0 |
| 9 | 35 | 7 | 0 |
| 9 | 40 | 5 | 0 |
| 9 | 40 | 6 | 100 |
| 9 | 40 | 7 | 0 |
| 10 | 40 | 5 | 100 |
| 10 | 40 | 6 | 0 |
| 10 | 40 | 7 | 0 |
| 10 | 45 | 5 | 0 |
| 10 | 45 | 6 | 100 |
| 10 | 45 | 7 | 0 |
| 10 | 50 | 5 | 0 |
| 10 | 50 | 6 | 0 |
| 10 | 50 | 7 | 100 |
| 11 | 50 | 5 | 0 |
| 11 | 50 | 6 | 12.7 |
| 11 | 50 | 7 | 87.3 |

Fig. 5B

TRAFFIC MONITORING SYSTEM FOR DETERMINING VEHICLE DIMENSIONS, SPEED, AND CLASS

BACKGROUND OF THE INVENTION

1. Field of Invention

This invention relates generally to traffic monitoring systems, specifically to an ultrasonic traffic monitoring system.

2. Prior Art

The traffic pattern and density on highways and streets are constantly changing. In urban areas, congestion usually occurs during the early morning or late afternoon hours, i.e., the commute hours when people drive to and from work. Traffic slacks off somewhat during mid day, and considerably so at night. Traffic accidents can happen any time of the day, but most occur during the congested commute hours. Collisions often cause traffic to be backed up for miles and for several hours. Whenever traffic is congested, frequent stop-and-go driving is necessary and wastes a lot of fuel, and air pollution is substantially increased. Also the work force's productivity is reduced, because time spent in traffic is taken away from time spent at work. As our population and economy grow, our highways and streets will only get more crowded, and driving time will only get longer.

Many television and radio stations use observation helicopters for traffic reports. Drivers who are informed of the trouble spots by these reports can take alternate routes. However, a helicopter can take up to 30 minutes to circle a typical urban area, so that the situation at an area surveyed during the early part of a flight may be changed by the time the report is aired. As a result, such information sometimes become inaccurate by the time it reaches the commuters or drivers, so that they could be facing completely different situations on the roads. Also these reports are broadcast at predetermined and infrequent intervals. Most drivers depart without hearing a report, so that they could easily drive onto a congested highway or road instead of taking an alternative route. Another drawback is the vagueness of the reports, which usually describe the traffic as simply backed-up, heavy, or light, without information on the speed of traffic flow. The inaccuracy, infrequency, and vagueness of traffic reports make them of limited use.

Various electronic systems have been proposed for monitoring and reporting traffic conditions. These are usually based on radar and video technologies. A typical radar system uses sensors that are similar to police radar, and are mounted at selected locations on the highways. The speed data they gather may be relayed to a central station. The primary drawbacks of the radar systems include the high power consumption of the radar units, and the inaccuracy of their gathered data.

Video systems fall into two types that differ in their level of automation. In the first type, video cameras mounted close to highways deliver live pictures to a central station, via cable or microwave link, where human operators simply look at video monitors to mentally analyze traffic conditions. This type of system is already in use in several cities in the U.S. For example, SmartRoute Systems of Cambridge, Mass., employs this technology in the Boston area. In the second type of video system, each video camera is pointed at a single lane. Successive video frames are analyzed by a computer to determine traffic speed automatically. However, this system is expensive to produce and install. The cameras are vulnerable to theft because of their high value. Furthermore, their high power consumption prevents them from being self-powered by solar cells, so that they cannot be used in areas where electrical supply lines are not readily available. Still another drawback is their inability to function in poor weather, such as dense fog, snow fall, or blizzards.

OBJECTS AND ADVANTAGES

Accordingly several objects and advantages of the invention are to provide a traffic monitoring system which provides current, frequent, and real time traffic information, and which provides more accurate, useful, and specific traffic information. Other objects and advantages are to provide a traffic monitoring system which continually monitors the average speed of the traffic at many different points along frequently traveled roads, which allows drivers to access the speed information at any point on any road, which alerts the police and highway management agencies of any traffic incidents, which pinpoints the traffic incidents, which gathers statistical data on the vehicles using the roads for government agencies or other interested parties, and which can be used in all weather conditions.

These advantages will keep drivers who are informed of the traffic conditions by the monitoring system so that they can take alternative routes if their original routes are congested. Such drivers will ease the burden on the main roadways, therefore ultimately congestion will be reduced, resulting in shortened travel or commute times, reduced pollution, and improved productivity. Police departments and the highway patrol will react more quickly and efficiently since traffic incidents will be pinpointed by the monitoring system. Government agencies can use the traffic statistics for improved construction and budget planning.

Further objects and advantages will become apparent from a study of the following description and the accompanying drawings.

DRAWING FIGURES

FIG. 5A is a table of vehicle data.

FIG. 5B is a probability table.

| | |
|---|---|
| 10. Monitoring Nodes | 11. Central Station |
| 12. Sonar Ranging Module | 13. Supporting Bar |
| 14. Microcontroller | 15. Ultrasonic Transducer |
| 16. Transducer Driver | 17. Communication Link |
| 18. Battery and Solar Charger | 19. Vehicle |
| 20. Housing | 21. Vehicle Profiles |
| 22. Vehicle Profile | 23. Vehicle Profile |
| 24. Data Points | |
| 30. Manufacturers Column | 31. Vehicle Class Column |
| 32. Row Numbers Column | 33. Height Column |
| 34. Length Column | 35. Total Numbers Column |

SUMMARY OF THE INVENTION

In one embodiment, a traffic monitoring system includes a large number of monitoring nodes spread out along many roadways, and connected to a central station via a communication link. Each monitoring node includes an ultrasonic sonar ranging module mounted over each lane of a road, and a microcontroller located nearby for controlling the sonar module. Each ranging module continually monitors vehicles crossing underneath. The microcontroller estimates the average speed of the vehicles, i.e., the flow of traffic, then sends the information to the central station. The traffic speed information at the nodes can be disseminated from the central station to interested users by phone, radio, television, or other methods.

In another embodiment, a traffic monitoring system includes nodes which each have a pair of sonar modules spaced apart along each lane of a roadway. The pair of sonar modules measure the height of the vehicles crossing underneath, and also form a speed trap for accurately measuring the traffic speed. Suitable software allows the microcontroller or the central station to estimate the classes of the vehicles by using their height and length data.

Figure 1A:
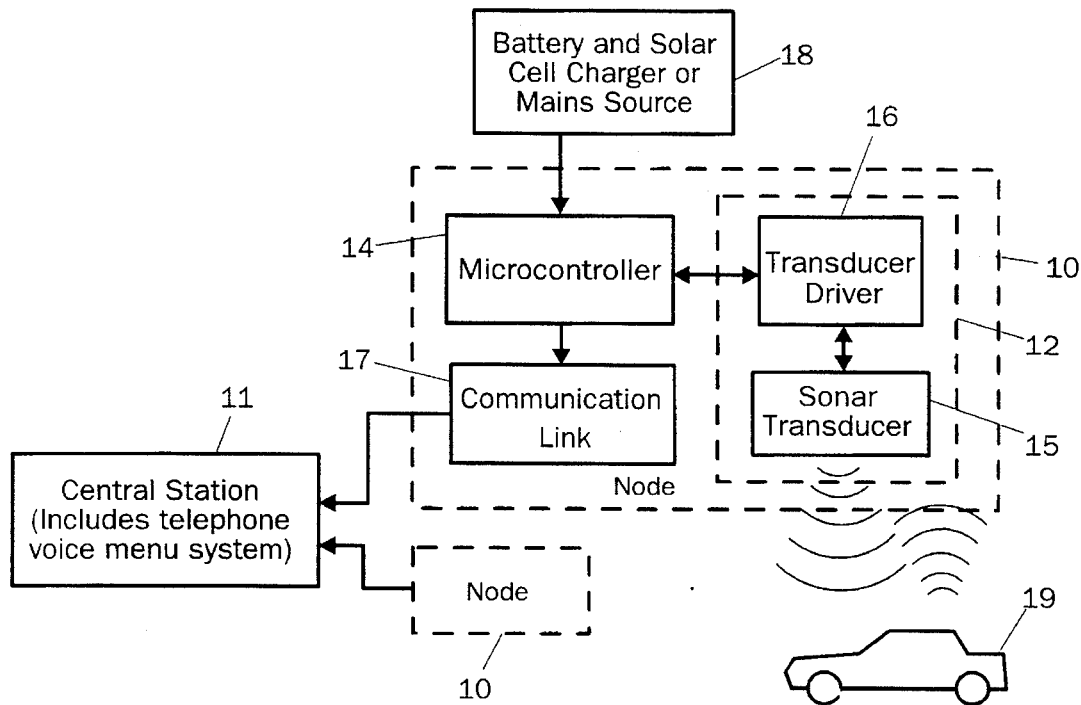
FIG. 1A is a block diagram of a traffic monitoring system in accordance with a first embodiment of the invention.
Figure 1B:
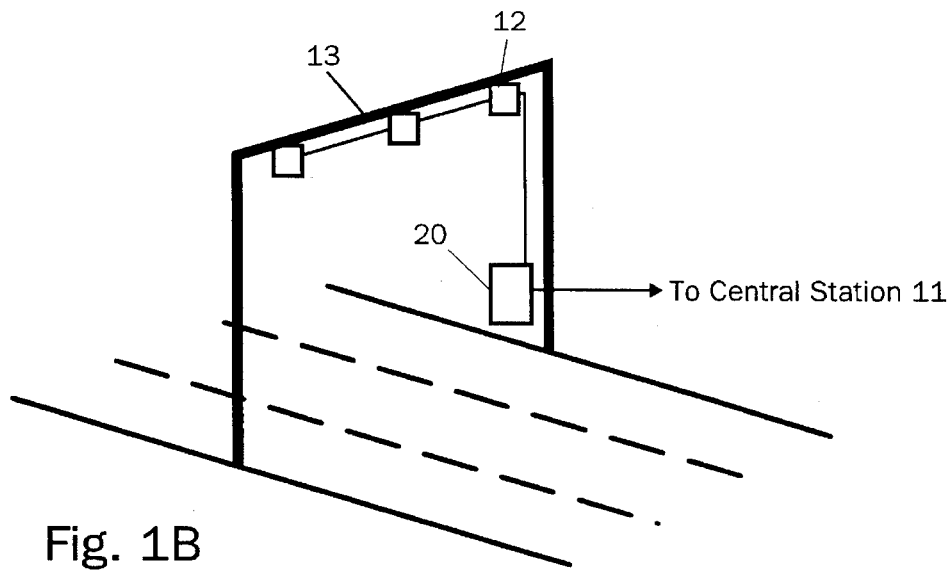
FIG. 1B is a perspective view of a node of the traffic monitoring system of FIG. 1A.

Description—FIGS. 1A and 1B—First Embodiment

In accordance with a first embodiment of the invention shown in FIG. 1A, a traffic monitoring system includes plural monitoring nodes 10 positioned along roadways, and linked to a remotely located central station 11, which can include suitable computers and other equipment (not shown) known in the art for distributing traffic information to users. Nodes 10 can be distributed at regular intervals along roads, such as every block on city streets, or every kilometer on expressways. Alternatively, they can be placed only at sections of roadways that are prone to congestion, such as major urban streets and expressways. For a large metropolitan area, the number of nodes 10 can range from hundreds to thousands.

Each node 10 monitors traffic at a specific point of a road, and includes an ultrasonic height measuring device or sonar ranging module 12. It is positioned about 6 meters above and directed downwardly at each lane of a road on a supporting bar 13, as shown in FIG. 1B. Sonar module 12 can be positioned at other heights, as long as they are positioned high enough to clear the tallest anticipated vehicles, but not higher than their maximum effective range. They can also be mounted on overhead passes or bridges (not shown) instead of bar 13. In this example, three sonar modules 12 are shown mounted over a three lane road, but other roads having different numbers of lanes can be equipped with nodes having equivalent numbers of modules.

Node 10 also contains a single-chip computer or microcontroller 14, such as any one from the Intel 8051 or Dallas Semiconductor DS-5000 family of microcontrollers. Microcontroller 14 controls sonar modules 12. Each sonar module 12 includes an ultrasonic transducer 15 driven by a transducer driver 16, both of which are conventional components available from Polaroid Corp., Cambridge, Mass., as part numbers 604142 and 615077, respectively. The operation of ultrasonic sonar technology is well known in the art, but basically microcontroller 14 sends trigger signals (not shown) to sonar module 12, which in turn sends out ultrasonic pulses at a certain repetition rate. Module 12 includes an ultrasonic receiver which produces an output signal (not shown) when it detects a return echo reflected by an object, such as a motor vehicle 19. It has an effective range of about 10 meters. Module 12 sends the output signal back to microcontroller 14; this signal is delayed with respect to the trigger signal (not shown) sent to sonar module 12 by microcontroller 14, and the length of the delay is directly proportional to the distance between the object and transducer 15. Sonar module 12 is virtually immune to adverse weather: it can function reliably in rain, fog, and snow. Sonar modules 12 are directed downwardly for detecting the passage of vehicles underneath.

Node 10 also includes a communication link 17 which connects microcontroller 14 to central station 11, either by a modem on a conventional phone line, a direct fiber optic link, a radio transmitter, or any other suitable communication device. Microcontroller 14 and communication link 17 are contained in a housing 20 mounted near the bottom of bar 13. Each node 10 can be powered by electrical supply lines if available, otherwise a battery and solar charger combination 18 can be used as a power source.

Figure 2:
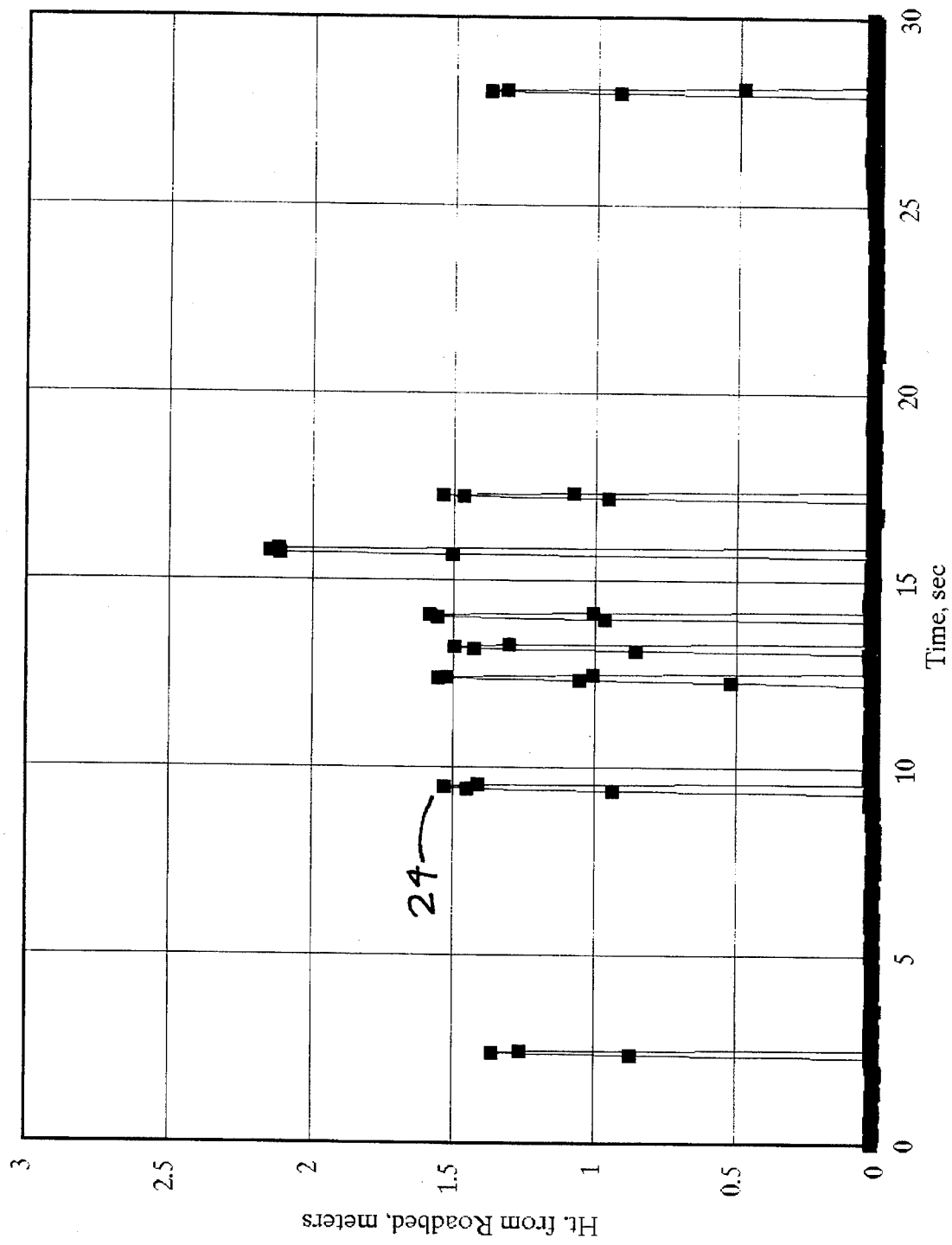
FIG. 2 is a plot of actual data taken on a trial of the traffic monitoring system.

Operation—FIGS. 1A to 2

Microcontroller 14 is programmed with suitable instructions to poll sonar modules 12 at up to 30 Hz, and translate any output from them into distances. The distance to the roadbed is taken as a baseline, so that any change in this distance is taken to be the height of a vehicle that passes underneath. For example, if a sonar module 12 is polled at 16 Hz, an average car having a length of 5.5 meters and traveling at 80 km/hour will take 0.25 second to pass under sonar module 12, and will reflect about 4 pulses. Actual data taken along one lane of a roadway is shown in FIG. 2, which is a plot of vehicle height over a period of 30 seconds. Each cluster of data points 24, which are connected by a line for clarity, represents the height at different points of a vehicle which passed underneath sonar module 12. The clusters clearly show the vehicles to be of different sizes.

For each particular vehicle height, a standard length is assigned by determining the statistical average length of existing vehicles with that height. For example, vehicles having a height of about 1.5 meters are assigned a length of 5.5 meters to represent the approximate dimensions of an average passenger car. Vehicles having a height of about 2 meters are assigned a length of about 7 meters to represent the approximate dimensions of an average full-size pickup truck. Vehicles having a height of 3.5 meters are assigned a length of about 20 meters to represent the approximate dimensions of an average semi-trailer truck. The interval between the first and last data points in each cluster is about 0.3 second, which equals the crossing time each vehicle took to pass under sonar module 12. The crossing time can be calculated by multiplying the time between individual pulses, which in this example is 0.0625 second (1÷16 Hz), by the total number of intercepted pulses, which in this example is 5.

Using this vehicle height vs. length information and the crossing time, the approximate speed of a crossing vehicle having a particular measured height and an assigned length can be determined by dividing the length by the crossing time. The standard length for each measured height can be stored in microcontroller 14, so that the calculated vehicle speeds are transmitted to central station 11. Alternatively, the length information can be stored at central station 11, where the vehicle speeds are calculated. In either case, central station 11 gathers and continually updates information on the speed of traffic flow at all nodes 10.

Drivers and other interested users will call central station 11 with a suitable interface, preferably a voice menu system, to obtain the current traffic speed on a selected roadway. The traffic information will be continually monitored by police departments for traffic accidents. When an accident occurs, it will be pinpointed by the node which reports very slow traffic speed. This will improve police and paramedic response. The information will also be transmitted to television and radio stations for broadcast. Other ways of disseminating the information can also be used.

The knowledge of slow traffic on a planned route will allow informed drivers to take alternative routes, so that fewer drivers will blunder onto a congested roadway. As a result, congestion will be reduced. Drivers taking alternate routes will reduce their travel time. Ultimately, productivity is improved because of more efficient transportation, and fuel consumption and pollution are both reduced.

Figure 3A:
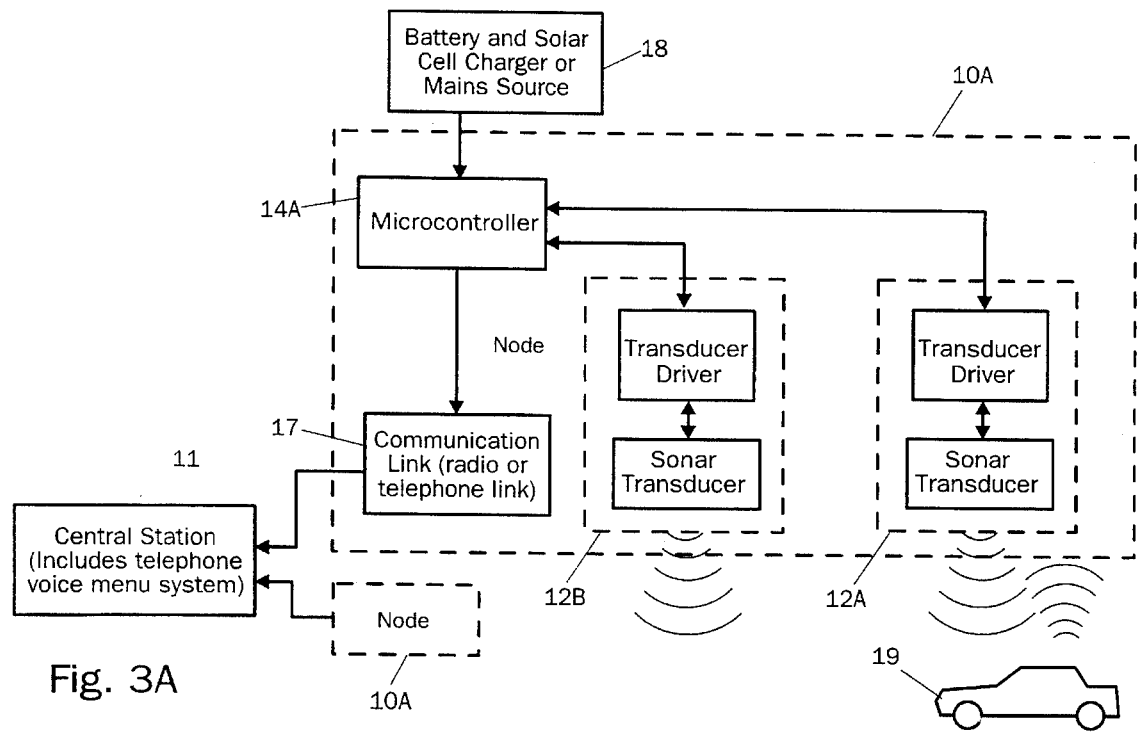
FIG. 3A is a block diagram of a traffic monitoring system in accordance with a second embodiment of the invention.
Figure 3B:
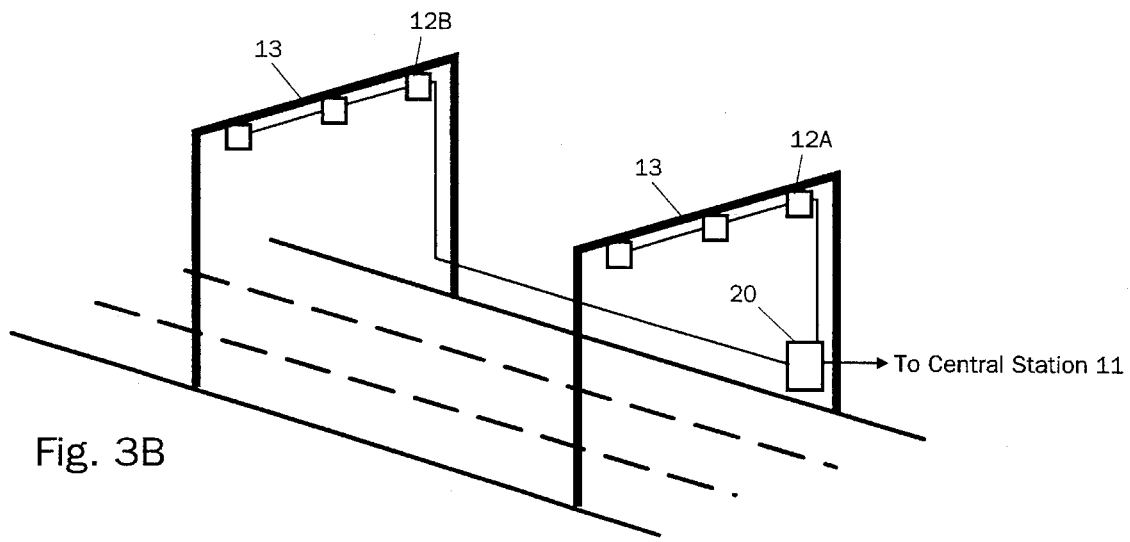
FIG. 3B is a perspective view of a node of the traffic monitoring system of FIG. 3A.

Description FIGS. 3A and 3B—Second Embodiment

A second embodiment of the traffic monitoring system is shown in FIGS. 3A and 3B. It is similar to the first embodiment, except each node 10A includes a pair of pulsed sonar ranging modules 12A and 12B for monitoring each lane. Sonar modules 12A and 12B are mounted about 30 meters apart along a lane to setup a speed trap. The traversal time a vehicle takes to cross from under module 12A to module 12B will cause them to produce two sequential sets of signals (not shown) separated by the traversal time interval. These signals are fed to microcontroller 14A, which is programmed with suitable instructions to calculate the precise speed of the vehicle by dividing the separation distance between the modules by the traversal time. To complete the speed trap, a camera (not shown) is mounted on bar 13 so that microcontroller 14A will cause it to photograph and keep a record of vehicles exceeding the speed limit, together with their actual speed. The time the vehicle took to cross under one of the modules, i.e., the crossing time, is also measured in the same manner as described in conjunction with FIGS. 1A to 2. Therefore the length of the vehicle can also be accurately determined by multiplying its precisely measured speed by its crossing time.

Operation—FIGS. 3A to 5B

Node 10A can measure the traffic speed on a road to produce simple traffic reports, such as that described in conjunction with the first embodiment of the traffic monitoring system. In addition, because node 10A can measure both the height and the length of the vehicles, the type or class of vehicles passing any section of roadway can also be estimated.

Figure 4:
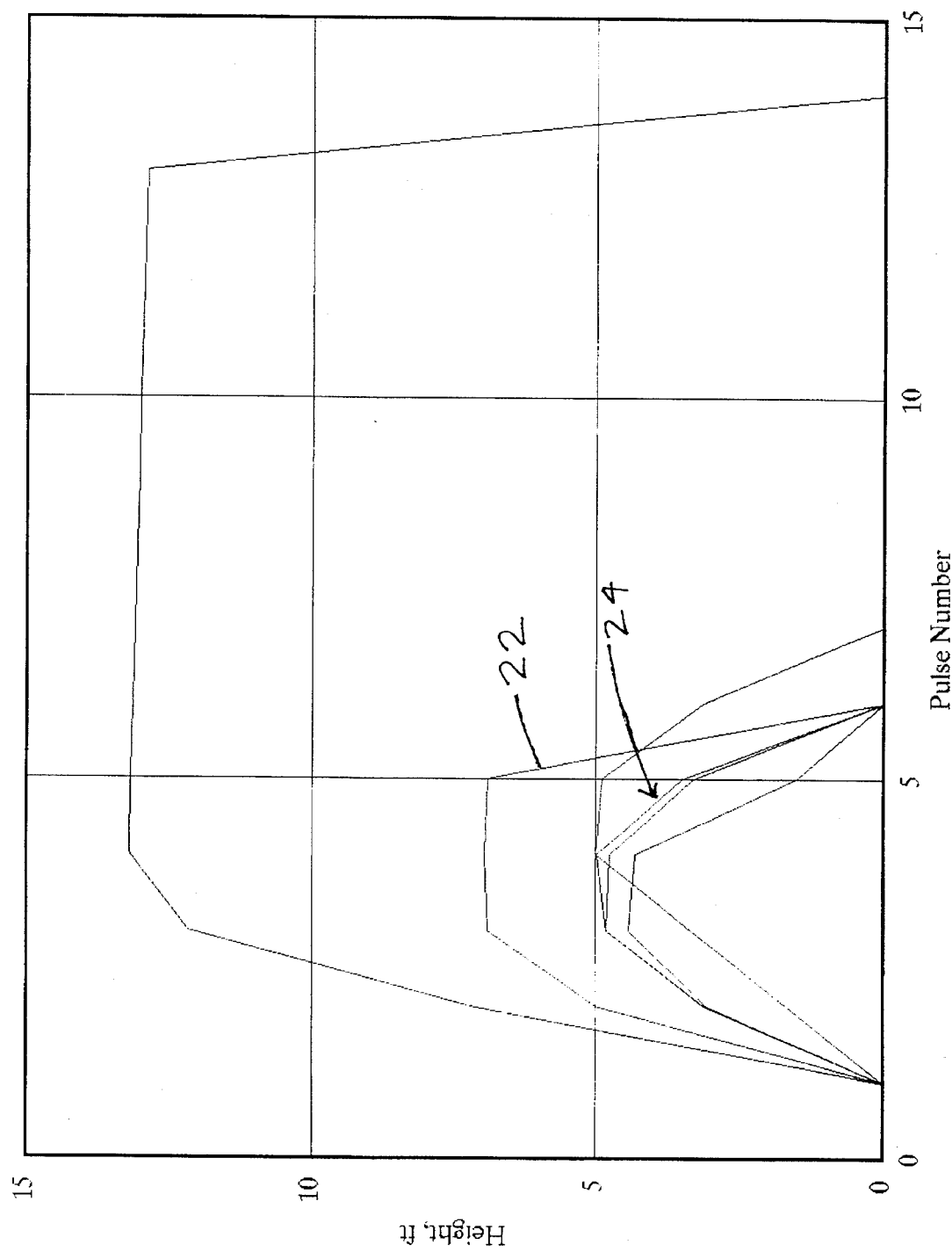
FIG. 4 is a plot of the profiles of several vehicles.

The actual measured profiles of some vehicles are shown in FIG. 4, which is a plot of vehicle height versus the number of pulses intercepted. The number of pulses intercepted is a representation of vehicle length, because at any given speed, the longer a vehicle, the more pulses it will intercept. A group of tightly packed profiles 21 contain profiles of four vehicles which are all about 1.5 meters (5 feet) tall and about the same length, so that they are probably conventional passenger vehicles. Profile 22 is of a vehicle that is of the same length as those in profiles 21, but somewhat taller, so that it is probably represents a mini-van. Profile 23 is substantially taller and longer than the others, so that it probably represents a semi-trailer truck.

The Federal Highway Administration (FHWA) divides vehicles into many classes. For example, motorcycles are classified as Class 1, passenger cars are classified as Class 2, pickup trucks or recreational vehicles belong to Class 3, commercial buses are in Class 4, 2-axle trucks belong to Class 5, 3-axle trucks belong to Class 6, and so on.

The classes of the vehicles crossing under node 10A can be estimated by first preparing a table of the characteristics of all vehicles using all U.S. roads. An example table 30 is shown in FIG. 5A, where individual vehicles numbered 1 to 17 (column 31) are listed in rows. In this example, all vehicles are made by three major U.S. manufactures GM, Chrysler, and Ford (column 32). They are in FHWA classes 5 to 7 (column 33). Each vehicle has a unique height and length (columns 34 and 35, respectively), which are rounded off to the nearest foot (0.3 meter). The total number of vehicles in the U.S. of this type is listed in column 36. For instance, vehicle number 1 in row 37 is a GM vehicle in FHWA class 5 with a height of 9 feet (2.7 meters, column 34), a length of 35 feet (10.6 meters, column 35), and a total of 100,000 units (column 36).

The data listed in the table are converted into a probability table 40, as shown in FIG. 5B, using conventional statistical methods known in the art. In this probability table, column 41 lists vehicle height in increments of 1 foot (0.3 meter), column 42 lists vehicle length rounded off into increments of 5 feet (1.5 meters), column 43 lists the classes of the vehicles, and column 44 lists the probability of a vehicle having the specific combination of height and length in each row to be in a particular FHWA class. For example, vehicles having a height of 10 feet (3 meters) and a rounded-off length of 40 feet (12 meters) are listed in rows 45 to 47. They have a 0% chance of being in classes 6 and 7, as shown in rows 46 and 47, respectively, but a 100% chance of being in class 5, as shown in row 45. Therefore, the classes of all the vehicles crossing node 10A can be estimated in this manner, using their measured height and length information.

The probability table is programmed into microcontroller 14A, so that each vehicle measured by node 10A will be assigned a class, then the information will be transmitted to central station 11A. Alternatively the table can be programmed into a computer (not shown) at central station 11A, in which case node 10A will transmit only height, length, and speed information. The statistics that can be compiled with such information can include the number of vehicles in each class that travels a particular roadway in a given period, the daily density pattern of a particular roadway, etc. Many government agencies and commercial enterprises will find these statistics useful in many ways, including city planning, production planning, etc.

SUMMARY, RAMIFICATIONS, AND SCOPE

Accordingly the reader will see that we have provided a traffic monitoring system which can continually monitor the average speed of the traffic at many monitoring nodes spread out among many roadways. It can distribute current traffic information to many users. It can be reliably used under adverse weather conditions. In a second embodiment, it can estimate the classes of the vehicles crossing the nodes, and compile statistical data on road use.

Although the above descriptions are specific, they should not be considered as limitations on the scope of the invention, but only as examples of the preferred embodiment. Many other ramifications and variations are possible within the teachings of the invention. For example, the monitoring node can be used in other applications, such as traffic light control: the sonar module can be mounted ahead of a set of traffic lights for detecting the presence and the speed of approaching vehicles, so that a suitably programmed microcontroller can effect optimal cycling of the lights. The sonar modules can be polled at higher rates, e.g., 100 Hz, for greater accuracy.

Each monitoring node can include only one sonar module for monitoring just the middle lane of a multi-lane roadway, so that the measured traffic speed is approximately the average of the lanes. Sonar module pair 12A and 12B in the second embodiment can be separated by other distances. Just one of them can be used for taking height measurements, so that the other is used only for completing the speed trap. Therefore the reader is requested to determine the scope of the invention by the appended claims and their legal equivalents, and not by the examples given.

We claim:

1. A traffic monitoring device for determining an estimated speed of a vehicle traveling on a road, said vehicle having a predetermined height, comprising:

sonar ranging means mounted above said road for detecting the crossing of said vehicle and taking plural height measurements thereof, and computer means connected to said sonar ranging means for measuring a crossing time of said vehicle thereunder, and assigning an estimated length to said vehicle corresponding to said height measurements, and also calculating said estimated speed of said vehicle based on said crossing time and said estimated length, whereby said sonar ranging means will monitor the speed of said vehicle in clear weather, as well as in fog, rain, and snow.

2. The traffic monitoring device of claim 1 wherein said road includes plural lanes, and said sonar ranging means comprises plural sonar modules, each mounted over one of said lanes, so that all of said lanes are monitored.

3. The traffic monitoring device of claim 1, further including communication means for communicating said estimated speed to a central station at a location spaced apart from said sonar ranging means.

4. The traffic monitoring device of claim 3 wherein said communication means comprises a modem connected to said central station by a telephone line.

5. The traffic monitoring device of claim 3 wherein said communication means comprises a radio transmitter connected to said computer means, and a radio receiver connected to said central station.

6. The traffic monitoring device of claim 3 wherein said central station includes means for communicating average vehicle speed along a plurality of road locations to a user.

7. The traffic monitoring device of claim 1, further including a battery and a solar charger therefor, said battery being connected to supply power to said sonar ranging means.

8. A traffic monitoring device for determining an estimated class of a vehicle traveling on a road, said vehicle having a predetermined height, comprising:

a pair of sonar ranging means mounted a predetermined separation distance apart along said road for sequentially detecting the crossing of said vehicle thereunder, and taking plural height measurements of said vehicle, and computer means connected to said pair of sonar ranging means for measuring a crossing time of said vehicle under at least one of said pair of sonar ranging means, and measuring a transversal time of said vehicle between said pair of sonar ranging means, and calculating an estimated speed of said vehicle by using said separation distance and said traversal time, and calculating an estimated length of said vehicle by using said estimated speed and said crossing time, and also determining said estimated class of said vehicle by using said height measurements and said estimated length.

9. The traffic monitoring device of claim 8 wherein said road includes plural lanes, said traffic monitoring device further including additional plural pairs of said sonar ranging means, each of said pairs being mounted above one of said lanes.

10. The traffic monitoring device of claim 8, further including communication means for communicating said estimated speed to a central station at a location spaced from said sonar ranging means.

11. The traffic monitoring device of claim 10 wherein said communication means comprises a modem connected to said central station by a telephone line.

12. The traffic monitoring device of claim 10 wherein said communication means comprises a radio transmitter connected to said computer means, and a radio receiver connected to said central station.

13. The traffic monitoring device of claim 8, further including a battery and a solar charger therefor, said battery being connected to supply power to said sonar ranging means.

14. The traffic monitoring device of claim 8 wherein said computer means includes a probability table which assigns a class probability to each of plural sets of vehicular dimensions.

15. A method of determining an estimated class of a vehicle traveling on a road, said vehicle having a predetermined height, comprising:

measuring a traversal time of said vehicle between a pair of ranging means spaced apart by a predetermined separation distance along said road, measuring a crossing time of said vehicle under one of said pair of ranging means, taking a set of height measurements of said vehicle with one of said pair of ranging means, determining an estimated speed of said vehicle by dividing said separation distance by said traversal time, determining an estimated length of said vehicle by multiplying said estimated speed by said crossing time, providing a table assigning a vehicle class to each of plural sets of vehicular height and length, and determining said estimated class of said vehicle by looking up said height measurements and said estimated length in said table.

16. The method of claim 15 wherein said road includes plural lanes, said method further including providing additional plural pairs of said ranging means, so that each of said pairs is mounted above one of said lanes.

17. The method of claim 15, further including communicating said estimated speed, said estimated length, and said estimated class of said vehicle to a central station at a location spaced apart from said ranging means.

18. The method of claim 17 wherein said estimated speed, said estimated length, and said estimated class are communicated to said central station with a modem connected to said central station with a phone line.

19. The method of claim 17 wherein said estimated speed, said estimated length, and said estimated class are communicated to said central station with a radio transmitter connected to said ranging means and a radio receiver connected to said central station.

20. The method of claim 15, further including providing a battery with a solar charger, said battery being connected to supply power to said sonar ranging means.

* * * * *